Aug. 30, 1960
J. B. WEAVER
2,950,502
PROCESS OF IMPARTING SMOOTHNESS TO THE
SURFACE OF A THERMOPLASTIC SHEET
Filed Oct. 9, 1956
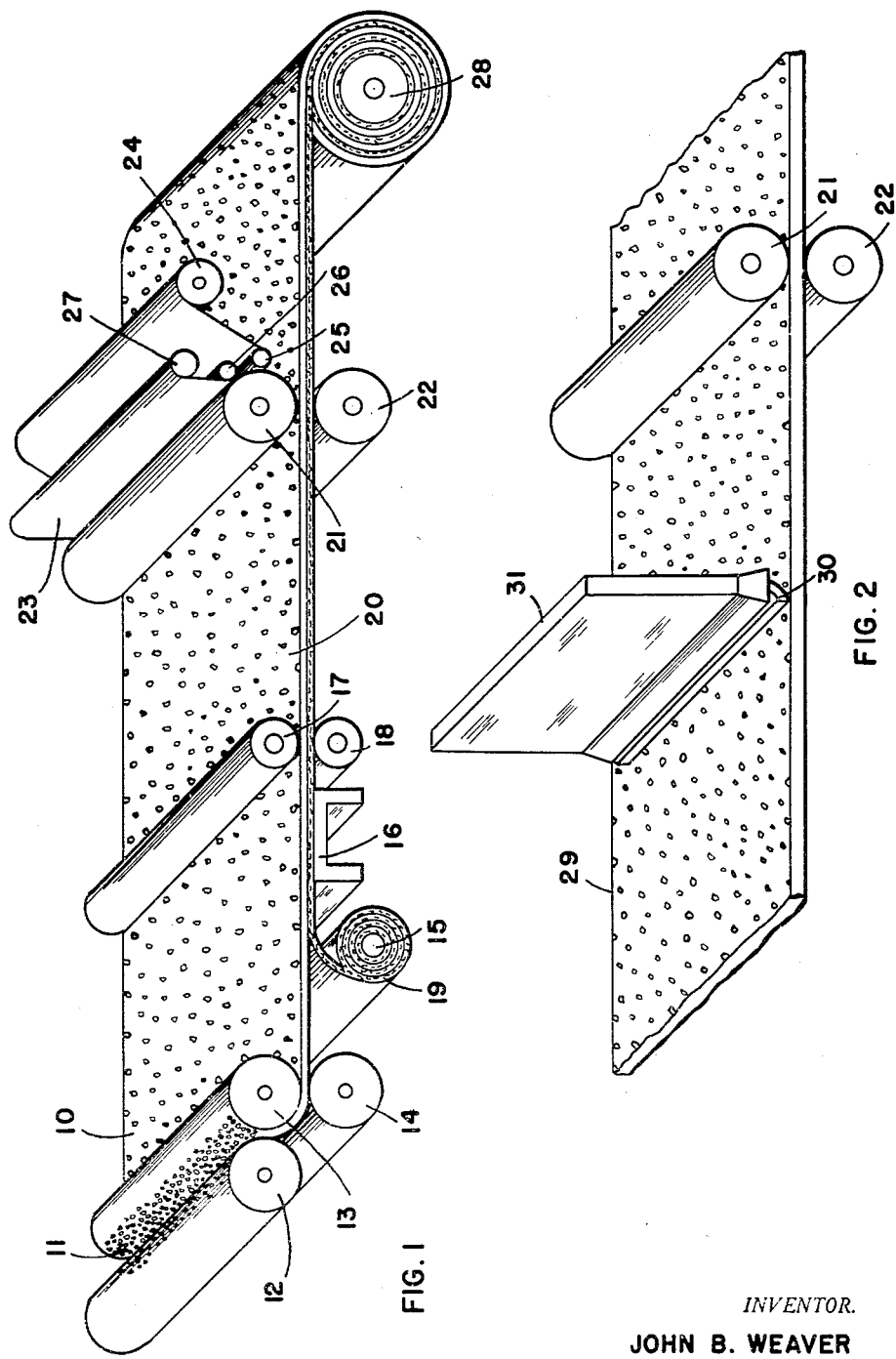
INVENTOR.
JOHN B. WEAVER
BY
*Richard T. Laughlin*
ATTORNEY United States Patent Office 2,950,502
Patented Aug. 30, 1960

2,950,502

PROCESS OF IMPARTING SMOOTHNESS TO THE SURFACE OF A THERMOPLASTIC SHEET

John B. Weaver, Wilmington, Del., assignor to Congoleum-Nairn Inc., Kearny, N.J., a corporation of New York Filed Oct. 9, 1956, Ser. No. 614,981

16 Claims. (Cl. 18—48)

This invention relates to flexible composition surface coverings and particularly to a process for preparing a covering having a thermoplastic resinous wear layer.

In the manufacture of a product, such as a smooth surface covering, it has long been recognized that the employment of a thermoplastic resinous composition which is sufficiently hard and tough at ordinary temperatures to be resistant to wear and indentations, offers certain advantages. One of the primary advantages of such a composition is its ability to be used immediately after cooling from the elevated temperature at which the thermoplastic resinous composition can be worked. Such properties of a thermoplastic resinous composition are to be contrasted with those of conventional linoleum compositions which depend on the use of drying oils, which requires prolonged exposure to air at an elevated temperature, to harden the composition. This operation is costly from the point of view of the time and labor involved and also in view of the size and cost of the equipment which is required.

In accordance with present commercial practices, plastic surface coverings are composed of plasticizers, thermoplastic resinous binders, pigments, stabilizers, fillers and the like. They are prepared in sheet and tile form and widely used as covers for floors, walls, countertops, etc. These plastic coverings usually range in thickness from about 0.015 inch to about 0.125 inch and are often prepared on backings of impregnated felt, burlap or similar materials.

Vinyl resins are most generally employed as the thermoplastic resinous material. Polyvinyl chloride and its copolymers, particularly polyvinyl chloride copolymerized with vinyl acetate are used in the greatest quantities. Copolymers of butadiene and acrylonitrile and butadiene with styrene have also found extensive used. These normally hard, brittle resins are rendered tough and flexible by the use of plasticizers. Conventionally this is accomplished by mixing all of the ingredients of the surface covering composition under conditions of high heat and pressure in a device such as a Banbury mixer. In this manner, the thermoplastic resin is plasticized and mixed with fillers, pigments, stabilizers and the like. The heat causes the thermoplastic resin to become soft and tacky and thus, in conjunction with the effect of the plasticizer, is able to function as a binder for the entire composition during processing. After mixing the composition, it is sheeted by passing it through calender rolls operating at temperatures of the order of 300° F. A plain color sheet is obtained in this manner which, after cooling, can be immediately used as a surface covering. A multi-colored composition can be obtained by mixing particles formed by breaking up a number of differently colored plain sheets and also by the addition of small particles of colored resin in the desired relative color proportions.

This type of palstic surface covering has proven highly satisfactory with respect to providing a product with a tough, wear resistant surface. Generally, these compositions are more soil resistant and easier to maintain than other types of surface coverings such as linoleum. Heretofore, however, it has not been possible to prepare surface coverings of thermoplastic resinous compositions on continuous calendering equipment wherein the surface is entirely free from small pits, irregularities and the like. Calendered thermoplastic resinous compositions are subject to some degree of soiling in use as the result of dirt accumulating in the small pits or pores which remain. A surface covering subject to this type of soil accumulation is more difficult to clean that one having a surface such that dirt and spills merely lie on the surface. Likewise, such a surface requires more frequent surface finishing in the nature of waxing to preserve its attractive appearance for the longest possible time.

In present commercial practice, finishing rolls are provided in the last step of the processing for the purpose of smoothing the calendered sheet to the greatest extent possible. Most often, finishing rolls comprise a highly polished steel, chrome plated roll working in conjunction with a steel roll or a roll coated with a resilient material. In this arrangement the chrome roll presses the thermoplastic resinous composition against the steel or resilient roll. These finishing rolls have always been maintained at a temperature below flow point of the thermoplastic resinous composition. This was necessary to prevent the design on the surface of the thermoplastic resinous composition from being altered and in the case of a felt backed sheet to prevent bulges forming in the laminated sheet.

An object of the invention is to produce a surface covering having a thermoplastic resinous wear layer which is substantially free from surface pits and pores. Another object of the invention is to produce a thermoplastic resinous composition having a high degree of luster. A further object of the invention is to produce such a composition in a simple and economical manner. Other objects and the advantages of the invention will appear hereinafter.

In accordance with the invention, a thermoplastic resinous composition which has been sheeted and formed into a web is pressed between two surfaces such as rotating rolls, one of which has a smooth, hard surface and is heated at the flow point of the thermoplastic resinous material and which is separated from the resinous material by a layer of a silicone compound and the other surface or roll is maintained at temperature below the flow point of the thermoplastic material.

The invention will be better understood from the following detailed description in which typical embodiments are set forth for the purpose of illustration in connection with the accompanying drawings wherein:

Fig. 1 is a perspective view which is illustrative of one type of apparatus which can be used in the practice of the invention.

Fig. 2 is a perspective view of a second type of apparatus which can be used in the practice of the invention.

Any suitable source of a sheet of thermoplastic resinous material can be employed. In Fig. 1 a calender is shown of the type which is adapted to produce a calendered sheet 10 from a uniform mass of thermoplastic resinous composition 11. The sheet 10 is produced from the mass 11 by passage between the several rolls 12, 13, 14 of a calender. If it is desired that the sheet 10 have a Jaspe appearance the mass 11, which is initially formed by passage between the rolls, can be a mixture of pieces of resinous composition of different color. If a marbleized sheet is desired then previously formed Jaspe sheets can be cross-calendered as by passage through a three-roll calender arranged in the manner indicated by the rolls 12, 13, 14. Any type of sheet forming apparatus can be employed for initial formation of the sheet.

When using a polyvinyl thermoplastic resinous composition the sheet is initially formed at an elevated temperature ranging from about 250° F. to about 350° F. The resulting sheet 10 can be bonded to a layer of backing material and for this purpose a web of felt such as asphalt saturated felt, burlap or other backing material is supplied from a roll 15 and is passed over a bed 16 to consolidating rolls 17, 18. The backing material 19 is coated with an adhesive which will bind the thermoplastic resinous sheet to the backing when passed through the consolidating rolls 17, 18.

The laminated sheet 20, having a thermoplastic resinous surface and a backing of fibrous material is passed through finishing rolls 21, 22. One roll 21 in the finishing unit contacts the surface of the sheet 20 and is heated at a temperature which causes the thermoplastic resinous composition to flow. At the flow temperature the thermoplastic film becomes soft and readily pliable although it retains its decoration and sheet form. The flow point of the thermoplastic composition is the temperature range above the softening point of the composition and below the temperature at which the composition decomposes. The second roll 22 which contacts the bottom of the laminated sheet 20 is maintained at a lower temperature below the flow point of the thermoplastic resinous material. The top roll 21 is separated from the surface of the laminate sheet 20 by a layer of silicone compound.

In one modification the silicone compound is a liquid which completely covers the roll. This can conveniently be accomplished by passing a sheet of material 23 such as fabric or paper toweling saturated with the liquid silicone compound over part of the surface of the roll thereby depositing a layer of the silicone on the roll. The fabric 23 saturated with the liquid silicone compound is passed from a feed roll 24 around small rolls 25, 26 which press the fabric 23 in contact with the surface of the finishing roll and then passes to a collecting roll 27. This method of applying the silicone compound has an advantage in that the fabric sheet cleans the surface of the roll as it applies the silicone compound to the roll. In this manner undesirable small particles of thermoplastic resinous material are removed from the roll thereby greatly facilitating the process. When the paper sheet 23 has been completely used, a fresh roll, saturated with the silicone compound, is inserted for the empty feed roll 24.

As an alternate procedure the fabric sheet 23 can be dipped into a trough containing a silicone compound which will saturate the sheet before the sheet 23 passes over the surface of the finishing roll 21. In place of the saturated fabric the silicone compound can be sprayed on the roll. The polished laminated sheet 20 passes from the finishing unit to a collection roll 28.

An alternate method for applying the silicone compound to the surface of the thermoplastic resinous sheet is shown in Fig. 2 wherein a thermoplastic sheet 29 is passed in contact with wick 30 saturated with the silicone compound. The wick maintains its saturation by means of container 31 which holds a reservoir of the silicone compound. The sheet 29 is then passed between the finishing rolls 21, 22 which are maintained at temperatures as indicated hereinabove, and wound on a suitable drum or the like. If desired the surface of the sheet 29 can be heated prior to finishing, such as by heat lamps, to raise its surface temperature to the flow point.

As an alternate procedure the top roll 21 in the finishing unit can be coated with silicone compound which remains unflowable at the temperature of the roll such as a silicone rubber or varnish. By this procedure the silicone compound will not remain in any appreciable amount on the surface of the thermoplastic resinous material whereas in the methods described hereinabove the thermoplastic resinous material becomes coated with a thin film of the silicone compound.

The thermoplastic resinous material most widely used in a surface covering as mentioned hereinabove is polyvinyl chloride and its copolymers. Polyvinyl chloride and copolymers of vinyl chloride and vinyl acetate which have specific viscosities above about 0.17 as measured in a solution containing 0.20 gram of resin per 100 milliliters of nitrobenzene at 20° C. and containing vinyl chloride ranging from about 90% to 97% by weight, are the preferred resinous materials. Copolymers of vinyl chloride with dibutyl maleate, ethyl acrylate, methyl acrylate, butyl acrylate, methylethyl acrylate, and butyl methyl acrylate, all containing substantially the same amount of combined vinyl chloride and having the same viscosity are also used. In addition, copolymers of vinyl chloride and acrylonitrile containing about 45% to 80% vinyl chloride can be used as well as copolymers of vinyl chloride and vinylidene chloride. Typical of other suitable resins are polyacrylonitrile, polymethyl acrylates, urea formaldehyde resins, polyesters such as ethylene glycol and terephthalic acid condensation products, polyamides such as hexamethylene diamine adipate, polyurethanes such as reaction products of toluene and diisocyanate, ethylene glycol adipate and the vegetable oil modifications thereof, melamine formaldehyde resins and hydrocarbon resins such as polybutylene and polyethylene.

The thermoplastic resinous materials are usually plasticized by any of a number of plasticizers such as tricresyl phosphate, dibutyl phthalate, tributyl phosphate, dioctyl phthalate, butyl phthalate, butyl glycollate, dimethoxy ethyl phthalate and the like.

The plasticized thermoplastic resinous material is mixed with suitable fillers and pigments which can constitute from about 20% to about 75% by weight of the composition. Typical of such ingredients are calcium carbonate, clay, silica flour, titanium dioxide, wood flour and the like. Generally, it is preferably to employ a substantial amount of a fibrous filler such as short asbestos fiber, cork, wood flour, and cellulose fibers in general. Typical formulations comprise from about 20% to about 50% of thermoplastic resin, about 10 to about 30% of plasticizer and about 20 to about 70% of filler, including pigments. Such and similar composition material is referred to herein as thermoplastic resinous material. This material is conventionally calendered into sheets having a thickness of less than about ⅛ inch and preferably of the order of about 0.015 inch to about 0.07 inch.

When utilizing a polyvinyl chloride resin such as a copolymer of 97% polyvinyl chloride and 3% polyvinyl acetate the sheet is formed at a temperature of about 250° F. to about 350° F. The finishing rolls are maintained at a temperature differential of from 100 to 300° F. The temperature of the roll on the top surface of the sheet would be approximately 340 to 400° F. and the bottom roll should be maintained at a temperature of about 50 to 200° F. The bottom roll is preferably maintained at such a low temperature when a felt backing is present since temperatures above this point will cause the felt to stick to the roll and cause the formation of bulges in the laminated sheet. The top roll is preferably a steel roll having a highly polished surface or is chrome plated. The bottom roll can be either a steel roll or a resilient roll having a rubber composition covering which will not be affected by the temperature of the finishing operation. The pressure applied to the surface of the thermoplastic resinous sheet material is preferably about 400 pounds per linear inch although this can be varied from about 200 to about 800 pounds per linear inch. The time that the thermoplastic resinous sheet is in contact with the finishing rolls will vary depending upon the speed of the sheet. A typical desirable contact time is from about 0.001 second to about 5 seconds with the preferred contact time of about 0.005 to 2 seconds.

The type of silicone compound which can be used varies in a wide range. The silicone compound can be a solid or liquid and can be of such a nature that it will coat the surface of a thermoplastic resinous sheet with a film of silicone compound. It is essential however that the silicone compound completely cover and separate the thermoplastic resinous sheet from the metal of the top roll, otherwise it will not be possible to obtain a sheet free of surface imperfections. Typical of the liquid silicone compounds which can be used are those classified as nonthermosetting organopolysiloxanes having alternate silicon and oxygen atoms in the skeletal structure and containing silicon-bonded hydrocarbon radicals. Such hydrocarbon radicals can be alkyl radicals such as methyl, ethyl, propyl, isobutyl, amyl, octyl, decyl or aryl radicals such as phenyl octyl, chloro phenyl, oxyl and the like and arylalkyl radicals such as benzyl, phenylethyl and phenylmethyl benzyl. Viscosities of the order of from 50 to 5,000 centistokes at 25° C. are preferred.

The preferred liquid organopolysiloxanes are those having from about 2 to 3.0 and particularly about 2 organic groups per silicon atom and at least one organic group being a lower alkyl group. The most readily available compounds are methylpolysiloxane and dimethylpolysiloxane. These liquid silicon compounds should remain liquid up to a temperature of 400° F. The liquid silicone compound is preferably transferred to the surface of the thermoplastic resinous sheet in a range of about 0.0001 to 0.010 pound per square yard and preferably within the range of 0.0005 to 0.001 pound per square yard.

When the finishing roll is coated with a solid silicone compound it is preferably a silicone varnish which is stable up to temperatures between 600 and 700° F. Such silicone varnish can be synthetic resin modified by the substituents of methylpolysiloxanes and can also be what is commonly called silicone rubber. Such rubbers are commonly produced by melting together a dimethyl silicon polymer, an inorganic filler and a vulcanizer. The polymer is of high molecular weight and in terms of viscosity can be from 3,000 to 1,000,000 centistokes. Typical of the inorganic filler used are titania, zinc oxide, iron oxide and silica. The vulcanizing agent is in general a peroxide such as benzyl peroxide.

Typical of the silicone compounds which can be used are those described in United States Patents 2,390,378, 2,397,727, 2,442,212, 2,446,135, 2,443,611, 2,448,756 and 2,469,888 and coming within the stated viscosities.

The following example is for the purpose of illustration:

*Example 1*

Thermoplastic resinous composition containing 25% of a copolymer of 97% vinyl chloride and 3% vinyl acetate, 10% dioctyl phthalanate, 50% limestone, 5% asbestos fiber, 3% stabilizer, 7% pigments, is calendered on a three-roll calender maintained at a temperature of 350° F. to form a sheet having a thickness of approximately 0.025 inch. The sheet is then laminated to a felt backing saturated with asphalt which is coated on the surface with adhesive comprising 50% Vinsol and 50% butadiene-acrylonitrile copolymer. Before lamination the adhesive is heated to its softening point and then then thermoplastic resinous sheet and felt passed through consolidating rolls which press the felt backing and sheet together to form a permanent bond. The laminated sheet is then passed through finishing rolls at the rate of 40 feet per minute. The top roll is chrome plated steel maintained at a temperature of 370° F. and which exerts a pressure of approximately 400 pounds per linear inch on the surface of the sheet. The bottom roll is maintained at 100° F. A silicone oil composed of methylpolysiloxane wherein the only hydrocarbon groups are methyl is applied to the entire surface of the top roll in an amount of about 0.001 pound per square yard of surface area. The silicone oil is deposited by the roll on the surface of the thermoplastic resinous material in approximately the same amount. The action of the silicone oil and the finishing rolls produces a surface on the thermoplastic resinous material which is substantially free from pits or pores and which has a greatly increased gloss.

Any departure from the above description which conforms to the present invention is intended to be included in the scope of the claims.

I claim:

1. A process for imparting improved smoothness to the wear surface of a sheet of thermoplastic vinyl resinous material which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface completely covered with a thin film of a liquid silicone compound and maintained at a temperature which causes the surface of the sheet contacting the roll to flow as it passes between said nip, the other roll being maintained at a temperature substantially less than the first roll, thereby consolidating said wear surface of the sheet and eliminating pits and grooves therefrom, and continuously removing said sheet from between and simultaneously out of contact with said rolls without reducing the temperature of said smooth hard surface roll.

2. A process for imparting improved smoothness to the wear surface of a sheet of thermoplastic vinyl resinous material having a decoration wherein the decoration is an integral part of the thermoplastic resinous material without substantially altering the decoration, which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and which is separated from the surface of the sheet by a silicone compound and the second roll maintained at a temperature substantially below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

3. A process for imparting improved smoothness to the wear surface of a sheet of thermoplastic vinyl resinous material which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and which is completely covered with a thin film of a liquid silicone compound having a viscosity of from 50 to 5000 centistokes and the second roll maintained at a temperature substantially below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

4. A process for imparting improved smoothness to the wear surface of a sheet of thermoplastic vinyl resinous material which comprises coating the sheet with a liquid organopolysiloxane having a viscosity of from 50 to 5000 centistokes and which remains liquid below 400° F., passing the sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and the second roll maintained at a temperature substantially below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

5. A process for imparting improved smoothness to the wear surface of a sheet of thermoplastic vinyl resinous material which comprises coating the sheet with 0.0001 to 0.10 pound per square yard of a liquid organopolysiloxane having a viscosity of from 50 to 5000 centistokes and which remains liquid below 400° F., passing the coated sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and the second roll maintained at a temperature substantially below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

6. A process for imparting improved smoothness to the wear surface of a sheet of thermoplastic vinyl resinous material which comprises coating the sheet with 0.0005 to 0.010 pound per square yard of a liquid organopolysiloxane having a viscosity of from 50 to 5000 centistokes and which remains liquid below 400° F., passing the coated sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and the second roll maintained at a temperature substantially below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

7. A process for imparting improved smoothness to the wear surface of a sheet of thermoplastic vinyl resinous material which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and being covered with a thin film of a liquid organopolysiloxane containing about 2 to 3 lower alkyl groups per silicone atom and having a viscosity of from 50 to 5000 centistokes and the second roll maintained at a temperature below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

8. A process for imparting improved smoothness to the wear surface of a sheet of thermoplastic vinyl resinous material which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface maintained at a temperature which causes the surface of the sheet contacting the roll to flow as it passes between said nip and the second roll maintained at a temperature below the temperature of the first roll, and continuously applying to the first roll a liquid methylpolysiloxane to completely cover the roll, thereby consolidating said wear surface of the sheet and eliminating pits and grooves therefrom, and continuously removing said sheet from between and simultaneously out of contact with said rolls without reducing the temperature of said smooth hard surface roll.

9. A process for imparting improved smoothness to the wear surface of a sheet of thermoplastic vinyl resinous material which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface coated with a solid silicone varnish which is stable below 700° F. and being maintained at a temperature which causes the surface of the sheet contacting the roll to flow as it passes between said nip and the second roll maintained at a temperature below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

10. A process for imparting improved smoothness to the wear surface of a sheet of thermoplastic vinyl resinous material which comprises continuously passing the sheet at a temperature below the flow point temperature of the sheet between the nip of two rotating rolls thereby applying uniform pressure on successive portions of the sheet, one roll contacting said wear surface of said sheet having a smooth hard surface covered with a dimethylsilicone rubber and maintained at a temperature which causes the surface of the sheet contacting the roll to flow as it passes between said nip and the second roll maintained at a temperature below the temperature of the first roll, thereby consolidating said wear surface of the sheet and eliminating pits and grooves therefrom, and continuously removing said sheet from between and simultaneously out of contact with said rolls without reducing the temperature of said smooth hard surface roll.

11. A process for imparting improved smoothness to the wear surface of a sheet of thermoplastic polyvinyl composition having a decoration wherein the decoration is an integral part of the thermoplastic composition without substantially altering the decoration, which comprises passing the sheet at a temperature below the flow point temperature of the sheet between two rolls rotating at substantially the speed of the advancing web thereby applying uniform pressure on successive portions of the sheet, one roll contacting said wear surface of said sheet having a smooth hard surface maintained at a temperature of from 360° F. to 400° F. sufficient to cause the surface of the sheet to flow and separated from the surface of the sheet by a thin film of a liquid organopolysiloxane having a viscosity of from 50 to 5000 centistokes, said roll being in contact with said wear surface for a period of about 0.005 to about 2 seconds.

12. A process for imparting improved smoothness to the wear surface of a sheet of thermoplastic polyvinyl chloride composition having a decoration wherein the decoration is an integral part of the thermoplastic composition without substantially altering the decoration, which comprises continuously passing the sheet at a temperature below the flow point temperature of the sheet between the nip of two rolls rotating at substantially the speed of the advancing web thereby applying uniform pressure on successive portions of the sheet, one roll contacting said wear surface of said sheet having a smooth hard surface maintained at a temperature of from 360° F. to 400° F. sufficient to cause the surface of the sheet to flow and separated from the surface of the sheet by a thin film of a liquid organopolysiloxane having a viscosity of from 50 to 5000 centistokes, said roll being in contact with said wear surface for a period of about 0.005 to about 2 seconds.

13. A process for imparting improved smoothness to the wear surface of a sheet of thermoplastic polyvinyl composition having a decoration wherein the decoration is an integral part of the thermoplastic composition without substantially altering the decoration, which comprises continuously passing the sheet at a temperature below the flow point temperature of the sheet between the nip of two rolls rotating at substantially the speed of the advancing web thereby applying uniform pressure on successive portions of the sheet, one roll contacting said wear surface of said sheet having a smooth hard surface maintained at a temperature of from 360° F. to 400° F. sufficient to cause the surface of the sheet to flow and separated from the surface of the sheet by a thin film of a liquid organopolysiloxane having a viscosity of from 50 to 5000 centistokes, the liquid organopolysiloxane being applied to the surface of the sheet at the rate of about .0001 to 0.10 pound per square yard of sheet, said roll being in contact with said wear surface for a period of about 0.005 to about 2 seconds.

14. A process for imparting improved smoothness to the wear surface of a sheet of thermoplastic polyvinyl resin composition having a decoration wherein the decoration is an integral part of the thermoplastic composition without substantially altering the decoration, which comprises continuously passing the sheet at a temperature below the flow point temperature of the sheet between the nip of two rolls rotating at substantially the speed of the advancing web thereby applying uniform pressure on successive portions of the sheet, one roll contacting said wear surface of said sheet having a smooth hard surface heated at a temperaure of from 360° F. to 400° F. sufficient to cause the surface of the sheet to flow and covered with a thin film of a liquid organopolysiloxane having a viscosity of from 50 to 5000 centistokes, the liquid organopolysiloxane being applied to the surface of the sheet at the rate of about .0001 to 0.10 pound per square yard of sheet, and the rolls exerting a pressure of about 200 to 800 pounds per linear inch on the surface of the sheet, said roll being in contact with said wear surface for a period of about 0.005 to about 2 seconds.

15. A process for imparting improved smoothness to the wear surface of a sheet of thermoplastic polyvinyl chloride composition having a decoration wherein the decoration is an integral part of the thermoplastic composition without substantially altering the decoration, which comprises continuously passing the sheet at a temperature below the flow point temperature of the sheet between the nip of two rolls rotating at substantially the speed of the advancing web thereby applying uniform pressure on successive portions of the sheet, the roll contacting the surface of the sheet having a smooth hard surface heated at a temperature of from 360° F. to 400° F. sufficient to cause the surface of the sheet to flow and being coated with a thin film of a liquid organopolysiloxane having a viscosity of from 50 to 5000 centistokes, the liquid organopolysiloxane being applied to the surface of the sheet at the rate of about .0001 to 0.10 pound per square yard of sheet, and the rolls exerting a pressure of about 200 to 800 pounds per linear inch on the surface of the sheet and being in contact with the sheet for a period of about 0.005 to about 2 seconds.

16. A process for imparting improved smoothness to the wear surface of a sheet of thermoplastic polyvinyl chloride composition having a decoration wherein the decoration is an integral part of the thermoplastic composition without substantially altering the decoration, which comprises continuously passing the sheet at a temperature below the flow point temperature of the sheet between the nip of two rolls rotating at substantially the speed of the advancing sheet and which exert a pressure of about 200 to 800 pounds per square inch on the surface of the web thereby applying uniform pressure on successive portions of the sheet, the roll contacting the surface of the sheet having a smooth hard surface heated to a temperature of about 360° F. to 400° F. sufficient to cause the surface of the sheet to flow and having continuously applied to the surface thereof a thin film of liquid methylpolysiloxane having a viscosity of about 50 to 5000 centistokes at a rate so that about 0.0005 to 0.010 pound per square yard are uniformly applied to the surface of the sheet, thereby consolidating said wear surface of the sheet and eliminating pits and grooves therefrom, and continuously removing said sheet from between and simultaneously out of contact with said rolls without reducing the temperature of said smooth hard surface roll.

References Cited in the file of this patent

UNITED STATES PATENTS

| | | |
|---|---|---|
| 2,096,973 | Munch | Oct. 26, 1937 |
| 2,208,236 | Wiener | July 16, 1940 |
| 2,218,227 | Winnek | Oct. 15, 1940 |
| 2,270,038 | Corbin | Jan. 13, 1942 |
| 2,318,111 | Steinberger | May 4, 1943 |
| 2,442,443 | Swallow | June 1, 1948 |
| 2,551,005 | Johnson | May 1, 1951 |
| 2,551,966 | Pierce | May 8, 1951 |
| 2,558,584 | Safford | June 26, 1951 |
| 2,753,275 | Wiles | July 3, 1956 |
| 2,811,408 | Braley | Oct. 29, 1957 |

FOREIGN PATENTS

| | | |
|---|---|---|
| 606,705 | Great Britain | Aug. 18, 1948 |